US012561922B2

(12) United States Patent
Bursill et al.

(10) Patent No.: US 12,561,922 B2
(45) Date of Patent: Feb. 24, 2026

(54) CAPTURE AND DISPLAY OF POINT CLOUDS USING AUGMENTED REALITY DEVICE

(71) Applicant: Trimble Inc., Westminster, CO (US)

(72) Inventors: Adam Bursill, Christchurch (NZ); Callum McLoughlin, Christchurch (NZ)

(73) Assignee: Trimble Inc., Westminster, CO (US)

( * ) Notice: Subject to any disclaimer, the term of this patent is extended or adjusted under 35 U.S.C. 154(b) by 119 days.

(21) Appl. No.: 18/658,567

(22) Filed: May 8, 2024

(65) Prior Publication Data

US 2025/0349085 A1 Nov. 13, 2025

(51) Int. Cl.
*G06T 19/00* (2011.01)
*G01S 19/14* (2010.01)

(52) U.S. Cl.
CPC ............ *G06T 19/006* (2013.01); *G01S 19/14* (2013.01)

(58) Field of Classification Search
CPC .............................. G06T 19/006; G01S 19/14
See application file for complete search history.

(56) References Cited

U.S. PATENT DOCUMENTS

| | | | |
|---|---|---|---|
| 2019/0325604 A1 | 10/2019 | Fink et al. | |
| 2021/0293546 A1 | 9/2021 | Zhang et al. | |
| 2025/0244485 A1* | 7/2025 | Pyke ........................ | G01S 19/03 |
| 2025/0272967 A1* | 8/2025 | Kim ........................ | G06V 10/26 |

OTHER PUBLICATIONS

Extended European Search Report for Application No. 24222755.1-1206, mailed Jun. 20, 2025, 8 pages.

* cited by examiner

*Primary Examiner* — Grace Q Li

(74) *Attorney, Agent, or Firm* — Kilpatrick Townsend & Stockton LLP

(57) ABSTRACT

Techniques for capturing and displaying point clouds using an AR device are described. A GNSS point of the AR device is determined based on received satellite signals. A depth image is captured while the AR device is positioned at the GNSS point. The depth image is projected into 3D space to obtain a point cloud having a set of points. An accuracy of the GNSS point is determined. In response to determining that the accuracy of the GNSS point is below a threshold, the GNSS point is determined to be a low-accuracy GNSS point, points from the set of points that are outside of a zone surrounding a previously determined high-accuracy GNSS point are removed, and remaining points from the set of points that are inside the zone are displayed on a display of the AR device.

20 Claims, 15 Drawing Sheets

668A 670-4

670-3

670-1

670-2

600

A

High-Accuracy Zone 678

CAPTURE AND DISPLAY OF POINT CLOUDS USING AUGMENTED REALITY DEVICE

BACKGROUND

The recent growth of virtual reality (VR) and augmented reality (AR) technologies has been remarkable. In most implementations, VR and AR systems include devices that allow digitally reproduced images to be presented to a user in a manner wherein they seem to be, or may be perceived as, real. A VR scenario typically involves presentation of digital or virtual image information without transparency to other actual real-world visual input, whereas an AR scenario typically involves presentation of digital or virtual image information as an augmentation to visualization of the actual world around the user.

Global navigation satellite systems (GNSS) use wireless signals that are transmitted from medium Earth orbit (MEO) satellites to GNSS receivers to determine position and velocity information for the GNSS receivers. Examples of currently operational GNSSs include the United States' Global Positioning System (GPS), the Russian Global Navigation Satellite System (GLONASS), the Chinese BeiDou Satellite Navigation System, and the European Union's (EU) Galileo. Today, GNSS receivers are used in a wide range of applications, including navigation (e.g., for automobiles, planes, boats, persons, animals, freight, military precision-guided munitions, etc.), surveying, mapping, and time referencing.

Despite the progress of VR and AR technologies, linking VR and AR devices to high-accuracy GNSS data has proven difficult. Accordingly, there is a need in the art for improved methods and systems related to VR and AR technology.

SUMMARY

A summary of the inventions are given below in reference to a series of examples. As used below, any reference to a series of examples is to be understood as a reference to each of those examples disjunctively (e.g., "Examples 1-4" is to be understood as "Examples 1, 2, 3, or 4").

Example 1 is a method of capturing point clouds using an augmented reality (AR) device, the method comprising: determining a global navigation satellite systems (GNSS) point of the AR device based on received satellite signals; capturing a depth image while the AR device is positioned at the GNSS point; projecting the depth image into 3D space to obtain a point cloud having a set of points; determining an accuracy of the GNSS point; and in response to determining that the accuracy of the GNSS point is below a threshold: determining that the GNSS point is a low-accuracy GNSS point; removing points from the set of points that are outside of a zone surrounding a previously determined high-accuracy GNSS point; and displaying remaining points from the set of points that are inside the zone on a display of the AR device.

Example 2 is the method of example(s) 1, wherein the depth image is projected into 3D space using intrinsic parameters of a camera of the AR device.

Example 3 is the method of example(s) 1-2, further comprising: determining a second GNSS point of the AR device based on the received satellite signals; capturing a second depth image while the AR device is positioned at the second GNSS point; projecting the second depth image into 3D space to obtain a second point cloud having a second set of points; determining an accuracy of the second GNSS point; in response to determining that the accuracy of the second GNSS point is above the threshold: determining that the second GNSS point is a high-accuracy GNSS point; updating the zone to surround the second GNSS point; and displaying each of the second set of points on the display.

Example 4 is the method of example(s) 3, further comprising: in response to determining that the accuracy of the GNSS point is below the threshold, storing the remaining points from the set of points in a database in an accumulated point cloud; in response to determining that the accuracy of the second GNSS point is above the threshold, storing each of the second set of points in the database in the accumulated point cloud; and displaying the accumulated point cloud on the display including the remaining points from the set of points and each of the second set of points.

Example 5 is the method of example(s) 3, further comprising: transforming the point cloud into an AR reference frame using an AR transformation matrix; and in response to determining that the accuracy of the second GNSS point is above the threshold, using the GNSS point to correlate the AR reference frame with a geospatial reference frame.

Example 6 is the method of example(s) 1-5, further comprising: displaying a virtual representation of the zone on the display.

Example 7 is the method of example(s) 1-6, wherein the AR device comprises a camera component including a camera and a sensor component including a GNSS receiver, and wherein the camera component is separable from and configured to removably attach to the sensor component.

Example 8 is a non-transitory computer-readable medium comprising instructions that, when executed by one or more processors, cause the one or more processors to perform operations for capturing point clouds using an augmented reality (AR) device, the operations comprising: determining a global navigation satellite systems (GNSS) point of the AR device based on received satellite signals; capturing a depth image while the AR device is positioned at the GNSS point; projecting the depth image into 3D space to obtain a point cloud having a set of points; determining an accuracy of the GNSS point; and in response to determining that the accuracy of the GNSS point is below a threshold: determining that the GNSS point is a low-accuracy GNSS point; removing points from the set of points that are outside of a zone surrounding a previously determined high-accuracy GNSS point; and displaying remaining points from the set of points that are inside the zone on a display of the AR device.

Example 9 is the non-transitory computer-readable medium of example(s) 8, wherein the depth image is projected into 3D space using intrinsic parameters of a camera of the AR device.

Example 10 is the non-transitory computer-readable medium of example(s) 8-9, wherein the operations further comprise: determining a second GNSS point of the AR device based on the received satellite signals; capturing a second depth image while the AR device is positioned at the second GNSS point; projecting the second depth image into 3D space to obtain a second point cloud having a second set of points; determining an accuracy of the second GNSS point; and in response to determining that the accuracy of the second GNSS point is above the threshold: determining that the second GNSS point is a high-accuracy GNSS point; updating the zone to surround the second GNSS point; and displaying each of the second set of points on the display.

Example 11 is the non-transitory computer-readable medium of example(s) 10, wherein the operations further comprise: in response to determining that the accuracy of the GNSS point is below the threshold, storing the remaining points from the set of points in a database in an accumulated point cloud; in response to determining that the accuracy of the second GNSS point is above the threshold, storing each of the second set of points in the database in the accumulated point cloud; and displaying the accumulated point cloud on the display including the remaining points from the set of points and each of the second set of points.

Example 12 is the non-transitory computer-readable medium of example(s) 10, wherein the operations further comprise: transforming the point cloud into an AR reference frame using an AR transformation matrix; and in response to determining that the accuracy of the second GNSS point is above the threshold, using the GNSS point to correlate the AR reference frame with a geospatial reference frame.

Example 13 is the non-transitory computer-readable medium of example(s) 8-12, wherein the operations further comprise: displaying a virtual representation of the zone on the display.

Example 14 is the non-transitory computer-readable medium of example(s) 8-13, wherein the AR device comprises a camera component including a camera and a sensor component including a GNSS receiver, and wherein the camera component is separable from and configured to removably attach to the sensor component.

Example 15 is a system comprising: one or more processors; and a non-transitory computer-readable medium comprising instructions that, when executed by the one or more processors, cause the one or more processors to perform operations for capturing point clouds using an augmented reality (AR) device, the operations comprising: determining a global navigation satellite systems (GNSS) point of the AR device based on received satellite signals; capturing a depth image while the AR device is positioned at the GNSS point; projecting the depth image into 3D space to obtain a point cloud having a set of points; determining an accuracy of the GNSS point; and in response to determining that the accuracy of the GNSS point is below a threshold: determining that the GNSS point is a low-accuracy GNSS point; removing points from the set of points that are outside of a zone surrounding a previously determined high-accuracy GNSS point; and displaying remaining points from the set of points that are inside the zone on a display of the AR device.

Example 16 is the system of example(s) 15, wherein the depth image is projected into 3D space using intrinsic parameters of a camera of the AR device.

Example 17 is the system of example(s) 15-16, wherein the operations further comprise: determining a second GNSS point of the AR device based on the received satellite signals; capturing a second depth image while the AR device is positioned at the second GNSS point; projecting the second depth image into 3D space to obtain a second point cloud having a second set of points; determining an accuracy of the second GNSS point; and in response to determining that the accuracy of the second GNSS point is above the threshold: determining that the second GNSS point is a high-accuracy GNSS point; updating the zone to surround the second GNSS point; and displaying each of the second set of points on the display.

Example 18 is the system of example(s) 17, wherein the operations further comprise: in response to determining that the accuracy of the GNSS point is below the threshold, storing the remaining points from the set of points in a database in an accumulated point cloud; in response to determining that the accuracy of the second GNSS point is above the threshold, storing each of the second set of points in the database in the accumulated point cloud; and displaying the accumulated point cloud on the display including the remaining points from the set of points and each of the second set of points.

Example 19 is the system of example(s) 17, wherein the operations further comprise: transforming the point cloud into an AR reference frame using an AR transformation matrix; and in response to determining that the accuracy of the second GNSS point is above the threshold, using the GNSS point to correlate the AR reference frame with a geospatial reference frame.

Example 20 is the system of example(s) 15-19, wherein the operations further comprise: displaying a virtual representation of the zone on the display.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Figure 1:
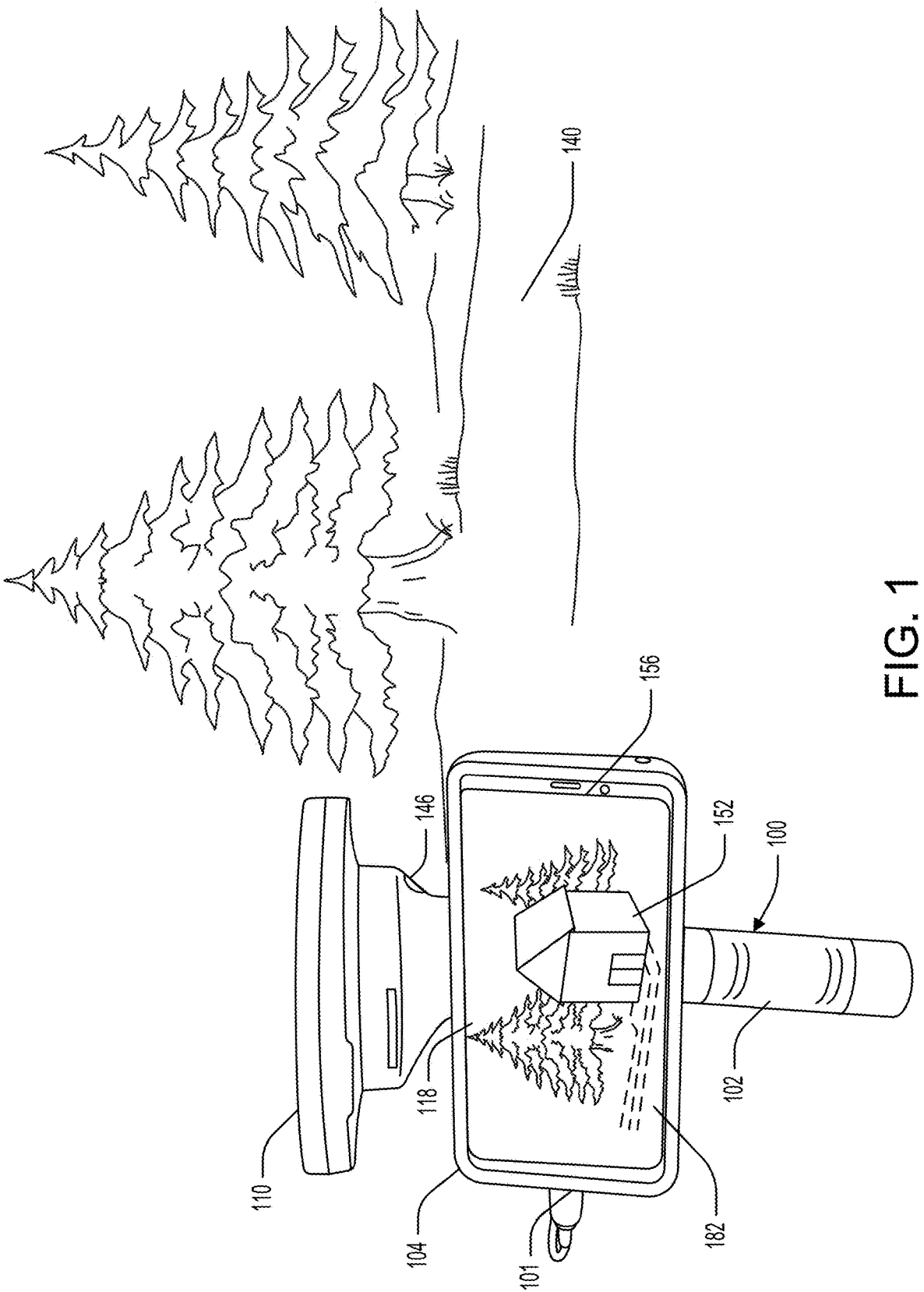
FIG. 1 illustrates an AR device comprising a camera component attached to a sensor component.

FIG. 1 illustrates an augmented reality (AR) device 100 comprising a camera component 104 attached to a sensor component 102, in accordance with some embodiments of the present disclosure. AR device 100 may be used at a potential construction site 140 or at any location where three dimensional (3D) rendered models may be displayed and superimposed onto images of real-world objects such as the earth, sky, water, stationary objects (e.g., roads, trees, buildings, etc.), movable objects (e.g., people, animals, vehicles, etc.), among other possibilities. Camera component 104 may include a camera (not shown in FIG. 1) for capturing a camera image 118 and a display 156 for displaying a model image 152 (e.g., an underground utility) that is superimposed onto camera image 118, collectively referred to as a superimposed image 182. Sensor component 102 may include a GNSS receiver 110 for providing high-accuracy position data of GNSS receiver 110. When the spatial relationship between GNSS receiver 110 and the camera of AR device 100 is known, the position data generated by GNSS receiver 110 may be used to determine the position of the camera, allowing proper placement of model image 152 onto camera image 118.

In some embodiments, sensor component 102 includes an electronic distance measurement (EDM) device 146 for measuring distances to discrete points within the field of view of the camera. In some embodiments, EDM device 146 is a device that transmits pulsed laser light towards a point of interest and measures the reflected pulses with a sensor. The distance between the device and the point of interest is estimated based on the return time or on phase measurements of the transmitted light. In some embodiments, EDM device 146 is a radar device that transmits an electromagnetic signal via an antenna towards the point of interest and measures the reflected electromagnetic signal via the transmitting antenna or a different receiving antenna. The distance between the radar device and the point of interest is estimated based on the return time. EDM device 146 may detect distances in a single direction or, in some embodiments, EDM device 146 may generate a distance map comprising a plurality of detected distances and the relative orientation for each distance.

Each of camera component 104 and sensor component 102 may comprise one or more structural components to support the attachment or integration of other components. For example, sensor component 102 may include a frame that allows attachment or integration of GNSS receiver 110 to the frame and attachment or integration of EDM device 146 to the frame. When attached or integrated to the frame, GNSS receiver 110 may have a known physical relationship to EDM device 146. As another example, camera component 104 may include a structural component that allows camera component 104 to be removably or permanently attached to sensor component 102. Similarly, sensor component 102 may include a structural component that allows sensor component 102 to be removably or permanently attached to camera component 104. The above-described structural components may include screws, bolts, nuts, brackets, clamps, magnets, adhesives, etc., to assist in attachment of the various components.

Figure 2B:
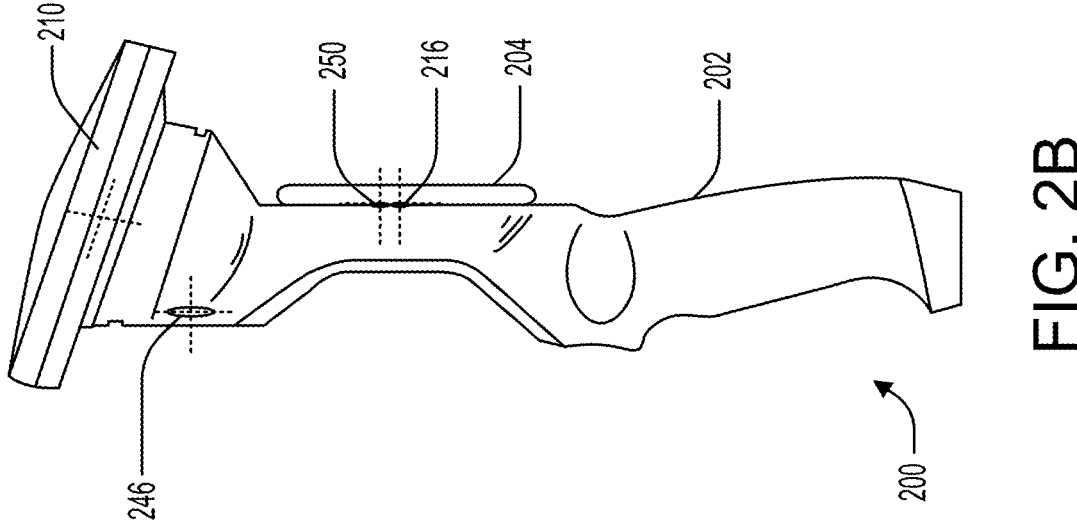
FIGS. 2A and 2B illustrate front and side views of AR device when a camera component is attached to a sensor component.
Figure 2A:
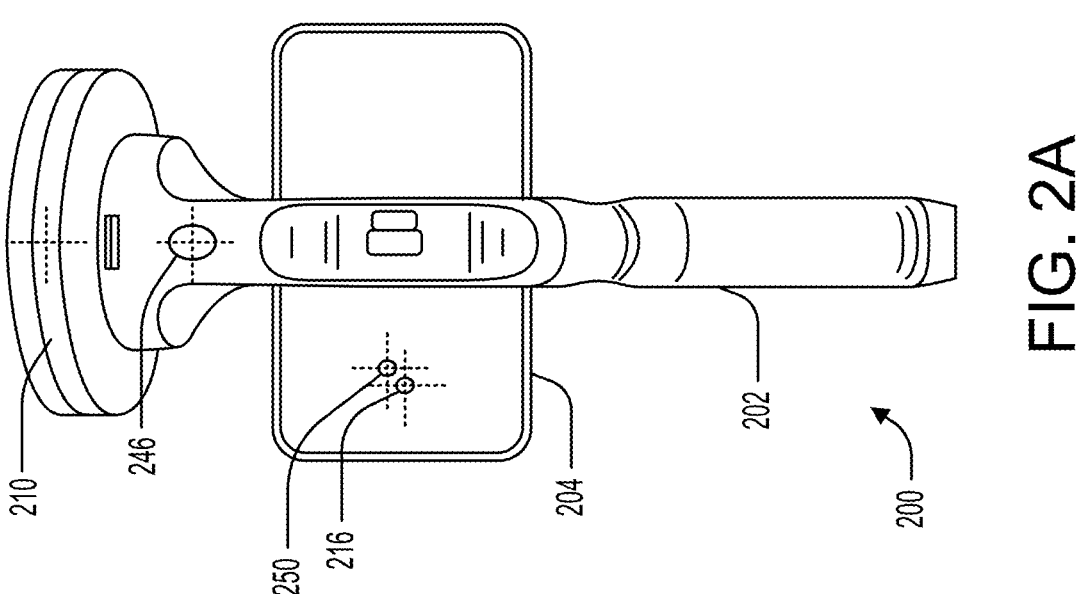

FIGS. 2A and 2B illustrate front and side views of AR device 200 when camera component 204 is attached to sensor component 202, in accordance with some embodiments of the present disclosure. Camera component 204 may include a camera 216 and a depth sensor 250. Sensor component 202 may include a GNSS receiver 210 and an EDM device 246. In the illustrated example, the positions and orientations of camera 216, depth sensor 250, GNSS receiver 210, and EDM device 246 are indicated by crosshairs. The position of GNSS receiver 210 may correspond to the phase center of the receiver's antenna, the position of EDM device 246 may correspond to the location(s) of the device's emitter and/or receiver, and the position of camera 216 may correspond to a point where the camera aperture is located (in accordance with the pinhole camera model).

When camera component 204 is rigidly attached to sensor component 202, known horizontal and vertical offsets may exist between the four devices. As such, calculation of the position and orientation of any one of the four devices can be used to obtain the positions and orientations of the other three devices. Furthermore, calculation of the position of one of the four devices and the orientation of another one of the four devices can be used to obtain the positions and orientations of all four devices. As an example, the measured position of GNSS receiver 210 can be combined with the measured orientation of camera 250 to obtain the missing orientation of GNSS receiver 210 and the missing position of camera 250 as well as positions and orientations of depth sensor 250 and EDM device 246. Known physical relationships between the devices allows captured data to be properly transformed during data processing by AR device 200.

Figure 3:
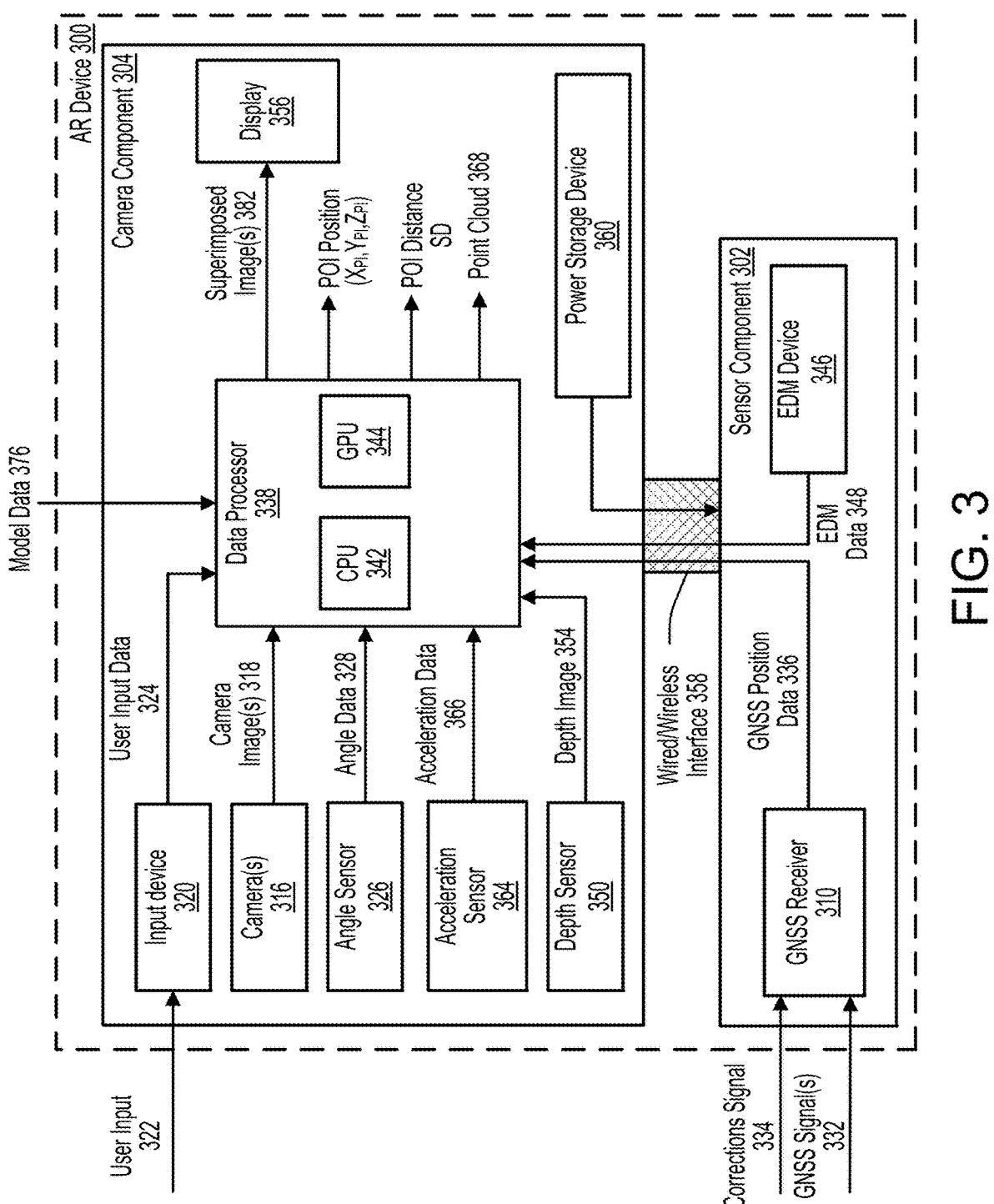
FIG. 3 illustrates a block diagram of an AR device having a camera component and a sensor component.

FIG. 3 illustrates a block diagram of AR device 300 having a camera component 304 and a sensor component 302, in accordance with some embodiments of the present disclosure. In the illustrated example, camera component 304 includes an input device 320, a camera 316, an angle sensor 326, an acceleration sensor 364, a depth sensor 350, a data processor 338, a display 356, and a power storage device 360. Further in the illustrated example, sensor component 302 includes a GNSS receiver 310 and an EDM device 346. When attached, data may be communicated from sensor component 302 to camera component 304 through a wired or wireless interface 358. In some examples, interface 358 comprises a universal serial bus (USB) through which power and data can be transferred between the components. For example, using power storage device 360, camera component 304 may transfer power to sensor component 302 via interface 358 to power the devices of sensor component 302.

Input device 320 may receive a user input 322 and generate user input data 324 based on user input 322. Input device 320 may be a button, a switch, a microphone, a touchscreen (e.g., integrated into display 356), among other possibilities. User input 322 may indicate a point of interest (by, for example, moving a cursor being displayed on display 356 so as to indicate the point of interest) for which a GNSS coordinate is to be calculated. Camera 316 may generate one or more camera images 318 of a scene. Camera images 318 may include a single image, multiple images, a stream of images (e.g., a video), among other possibilities. In some examples, camera image 318 may comprise a multi-channel image such as an RGB image.

Angle sensor 326 may generate angle data 328 indicative of the rotational movement of camera component 304 (and likewise AR device 300). Angle sensor 326 may be any electronic device capable of detecting angular rate and/or angular position. In some embodiments, angle sensor 326 may directly detect angular rate and may integrate to obtain angular position, or alternatively angle sensor 326 may directly measure angular position and may determine a change in angular position (e.g., determine the derivative) to obtain angular rate. In many instances, angle sensor 326 is used to determine a yaw angle, a pitch angle, and/or a roll angle corresponding to camera component 304 (and AR device 300). Accordingly, in various embodiments angle data 328 may include one or more of a yaw angle, a pitch angle, a roll angle, an orientation, or raw data from which one or more angles and orientations may be calculated. Angle sensor 326 may include one or more gyroscopes and may be included as part of an inertial measurement unit (IMU).

Acceleration sensor 364 may generate acceleration data 366 indicative of the linear movement of camera component 304 (and likewise AR device 300). Acceleration sensor 364 may be any electronic device capable of detecting linear acceleration. In some embodiments, acceleration sensor 364 may directly measure linear velocity and may determine a change in linear velocity (e.g., determine the derivative) to obtain linear acceleration. Alternatively or additionally, acceleration sensor 364 may directly measure linear position and may determine a change in linear position (e.g., determine the derivative) to obtain linear velocity, from which linear acceleration can be calculated. Acceleration data 366 may include one or more acceleration values or raw data from which one or more acceleration values may be calculated. Acceleration sensor 364 may include one or more accelerometers and may be included as part of an IMU.

Depth sensor 350 may generate a depth image 354 of the site. Depth sensor 350 may include a time-of-flight (ToF) sensor or a structured light sensor. In one example, depth sensor 350 may be a LIDAR sensor that emits laser pulses in various directions using a rotating mirror or a stationary array of lasers. By measuring the time it takes for each laser pulse to travel from the sensor to the object and back (round-trip time), a distance to a real-world object can be measured for each pixel in depth image 354. Depth image 354 may comprise a set of depth values.

GNSS receiver 310 may receive one or more GNSS signals 332 from one or more GNSS satellites to generate position estimates. In some embodiments, GNSS receiver 310 also receives a corrections signal 334 (using a same or different antenna) to apply corrections to the position estimates, allowing the position estimates to improve from meter accuracy to centimeter accuracy in many cases. Alternatively or additionally, corrections signal 334 may be received by camera component 304 (e.g., via a wireless interface), and data processor 338 may apply the corrections to the position estimates after receiving GNSS position data 336 from GNSS receiver 310. EDM device 302 may measure the distance between itself and a point of interest by transmitting pulsed laser light towards the point of interest and measuring the reflected pulses. EDM data 348 may include the measured distance or raw measurements used to compute the distance.

Data processor 338 may include suitable computing and memory resources for processing various input data and generating various outputs. In some examples, data processor 338 includes a central processing unit (CPU) 342 and/or a graphics processing unit (GPU) 344. Data processor 338 may receive data from various sources, including but not limited to, model data 376 from a 3D model repository, user input data 324 from input device 320, camera image 318 from camera 316, angle data 328 from angle sensor 326, acceleration data 366 from acceleration sensor 364, depth image 354 from depth sensor 350, GNSS position data 336 from GNSS receiver 310 (via interface 358), and EDM data 348 from EDM device 346 (via interface 358).

On the output side, data processor 338 may generate a superimposed image 382, a position of a point of interest ($X_{PI}$, $Y_{PI}$, $Z_{PI}$), a distance (e.g., a slope distance SD) between AR device 300 and the point of interest, and/or a point cloud 368. These outputs may be displayed at display 356, saved to a local database, or sent (e.g., wirelessly) to a remote database. Alternatively or additionally, these outputs may be used to perform other operations at AR device 300. For example, point cloud 368 may be accumulated in a point cloud database in which the accumulated point clouds are used for site monitoring.

Data processor 338 may perform operations to convert depth image 354 into point cloud 368. As depth image 354 includes a 2D array of depth values corresponding to each pixel in an image, converting into a point cloud involves reconstructing the 3D positions of points in the site from the depth information. In some examples, the intrinsic parameters of camera 316 can be used to ensure that depth image 354 is properly calibrated. For each pixel (x, y) in depth image 354, the corresponding 3D coordinate is calculated using the depth value z and the known intrinsic parameters as follows:

$$\text{Position} = \left( \frac{(x - o_x) * z}{f_x}, -\frac{(y - o_y) * z}{f_y}, z \right)$$

where $f_x$ and $f_y$ define the focal length of camera 316 and ox and oy are the principal point offsets of camera 316. In some examples, additional processing on the point cloud may be performed including filtering out noisy points or smoothing surfaces formed by neighboring points.

Figure 4:
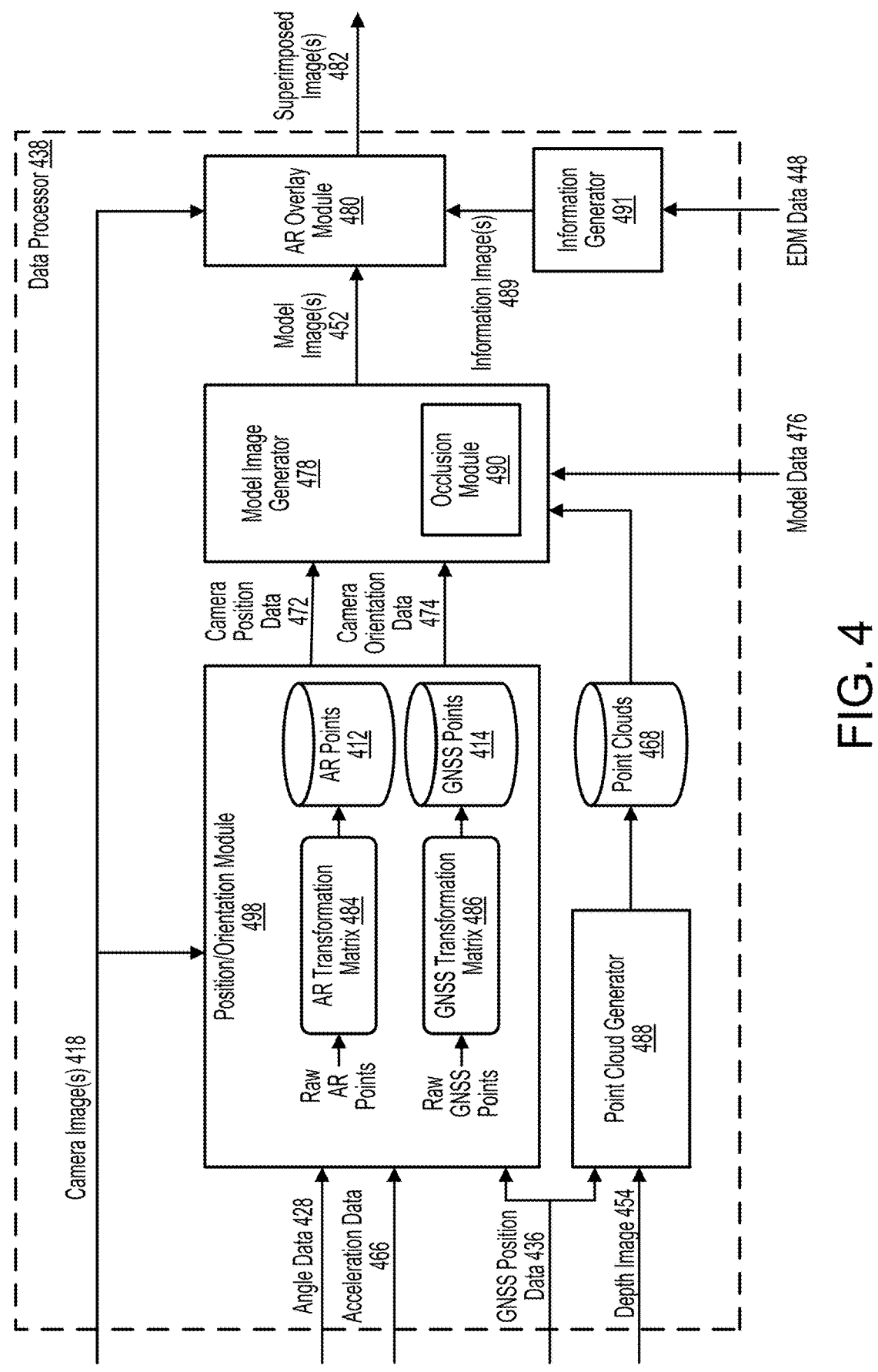
FIG. 4 illustrates a block diagram of a data processor.

FIG. 4 illustrates a block diagram of a data processor 438, in accordance with some embodiments of the present disclosure. Each of the modules and generators illustrated in FIG. 4 may be implemented in hardware and/or software. In some embodiments, data processor 438 includes a position/orientation module 498 for determining camera position data 472 and camera orientation data 474. Camera position data 472 may include a 3D coordinate (e.g., three values) representing the position of a camera at a particular time. Camera orientation data 474 may include a 3D vector (e.g., three values) representing the orientation of the camera at the particular time. Position/orientation module 498 may be configured to output positions and orientations periodically, at non-regular intervals, or upon receiving updated data from one or more of angle data 428, acceleration data 466, GNSS position data 436, and camera image 418.

In some embodiments, position/orientation module 498 determines/updates camera position data 472 and camera orientation data 474 based on GNSS position data 436 each time new GNSS position data 436 is received (referred to as a GNSS point). In some embodiments, position/orientation module 498 determines/updates camera position data 472 and camera orientation data 474 based on angle data 428, acceleration data 466, or camera image 418 each time new angle data 428, acceleration data 466, or camera image 418 is received (referred to as an AR point). In some instances, performance of the AR device is improved when AR points and GNSS points are conjunctively used to determine camera position data 472. In some instances, this is accomplished by maintaining two separate and independent frames: an AR reference frame (for tracking and handling AR points 412) and a geospatial reference frame (for tracking and handling GNSS points 414).

The AR reference frame represents a camera space which maintains the relationship between different AR points 412. For example, a first AR point at a first time may be (0, 0, 0) within the AR reference frame, a second AR point at a second time may be (22.3, −12.6, 0) within the AR reference frame, and a third AR point at a third time may be (34.0, −22.9, −0.1) within the AR reference frame. Any operations performed on the AR reference frame, such as shifting or rotating, causes all points within the AR reference frame to be similarly affected. For example, shifting the AR reference frame by (0, 5, 0) would cause the three AR points to become (0, 5, 0), (22.3, −7.6, 0), and (34.0, −17.9, −0.1), respectively. Each shift and rotate experienced by the AR reference frame is reflected in an AR transformation matrix 484, allowing newly captured raw AR points to be consistent with previous AR points. For example, each raw AR point may be transformed (e.g., multiplied) by AR transformation matrix 484 before being added to the dataset or database containing AR points 412, and as new shifts or rotates are applied to the AR reference frame, updates are made to AR transformation matrix 484 and AR points 412.

Similar to the AR reference frame, the geospatial reference frame represents a GNSS space which maintains the relationship between different GNSS points (3D positions determined based on GNSS position data 436). For example, a first GNSS point at a first time may be (10, 10, 10) within the geospatial reference frame, a second GNSS point at a second time may be (32.3, −2.6, 10) within the geospatial reference frame, and a third GNSS point at a third time may be (44.0, −12.9, 9.9) within the geospatial reference frame. Any operations performed on the geospatial reference frame, such as shifting or rotating, causes all points within the geospatial reference frame to be similarly affected. For example, shifting the geospatial reference frame by (0, 5, 0) would cause the three GNSS points to become (10, 15, 10), (32.3, 2.4, 10), and (44.0, −7.9, 9.9), respectively. Each shift and rotate experienced by the geospatial reference frame is reflected in a GNSS transformation matrix 486, allowing newly captured raw GNSS points to be consistent with previous GNSS points. For example, each raw GNSS point may be transformed (e.g., multiplied) by GNSS transformation matrix 486 before being added to the dataset or database containing GNSS points 414, and as new shifts or rotates are applied to the geospatial reference frame, updates are made to GNSS transformation matrix 486 and GNSS points 414.

Due to the differences between the two technologies, GNSS position data 436 is generally received less frequently than camera images 418 and does not suffer from initialization and drift issues that are problematic image-based pose data, e.g., the establishment of a new temporary local reference frame with the first AR point is generally set to (0, 0, 0). Furthermore, because of the initialization issues associated with image-based pose data (and also due to its inferior accuracy and drift over time and distance), the AR reference frame and the geospatial reference frame do not necessarily correspond to each other and therefore must be reconciled. To resolve these issues, among others, position/ orientation module 498 may perform a series of steps in order to determine camera position data 472 and camera orientation data 474 that incorporate each of camera images 418, angle data 428, acceleration data 466, and GNSS position data 436. These steps are illustrated in reference to FIGS. 5A and 5B.

Data processor 438 may include a point cloud generator 488 that receives depth image 454 and GNSS position data 436 and produces a set of georeferenced points clouds that are stored in a database as point clouds 468. Point cloud generator 488 may first convert depth image 354 into a raw point cloud using the camera's intrinsic parameters. Next, the raw point cloud can be transformed into the AR reference frame using AR transformation matrix 484. GNSS position data 436 may be used by point cloud generator 488 to perform a filtering function such that only points having high accuracy are added to the database containing point clouds 468.

In some embodiments, data processor 438 includes a model image generator 478 for generating a model image 452. Model image generator 478 may receive model data 476 which defines a model (e.g., a building, a structure, a tree, underground utilities, etc.) via a wired or wireless connection. Model data 476 may include 3D coordinates corresponding to the model as well as other information for generating model image 452, such as colors, textures, lighting, etc. In some embodiments, model image generator 478 generates model image 452 based on each of camera position data 472, camera orientation data 474, and model data 476. For example, as the camera position and/or orientation changes, model image 452 may also be modified to accurately reflect the difference in position and/or orientation (e.g., as the position of the camera gets further away from the position of the model, model image 452 may become smaller). In some embodiments, model image 452 is held static until a change in one or more of camera position data 472, camera orientation data 474, and model data 476 is detected by model image generator 478. In some embodiments, portions of model image 452 may be occluded by an occlusion module 490 when real-world objects are positioned in front of the 3D model. In some embodiments, occlusion module 490 may occlude camera image 418 where the 3D model is positioned in front of real-world objects.

Alternatively or additionally, point clouds 468 may be visualized at the AR device by inputting point clouds 468 into model image generator 478 and performing similar steps. For example, model image generator 478 may receive point clouds 468 and generate model image 452 so that point clouds 468 may be viewed at their proper georeferenced positions based on camera position data 472 and camera orientation data 474. As the camera position and/or orientation changes, model image 452 may also be modified to accurately reflect the difference in position and/or orientation. Occlusion module 490 may occlude points that are positioned behind real-world objects and optionally occlude portions of camera image 418 where points are positioned in front of real-world objects.

In some embodiments, data processor 438 includes an AR overlay module 480 for generating a superimposed image 482 by superimposing model image 452 onto camera image 418 (or by superimposing camera image 418 onto model image 452). Superimposed image 482 may be outputted to the display which displays superimposed image 482 for viewing by a user. In some instances, a user may select whether or not model image 452 is visible on the display or whether any transparency should be applied to model image 452 or camera image 418. In some embodiments, data processor 438 includes an information generator 491 for generating information that may be added to superimposed image 482. For example, information generator 491 may generate an information image 489 that may visually display the position of the AR device, the orientation of the AR device, the position of the point of interest ($X_{PI}$, $Y_{PI}$, $Z_{PI}$), a distance to the point of interest SD (as indicated by EDM data 448), among other possibilities. Accordingly, superimposed image 482 may be generated to include portions of camera image 418, model image 452, and/or information image 489.

Figure 5A:
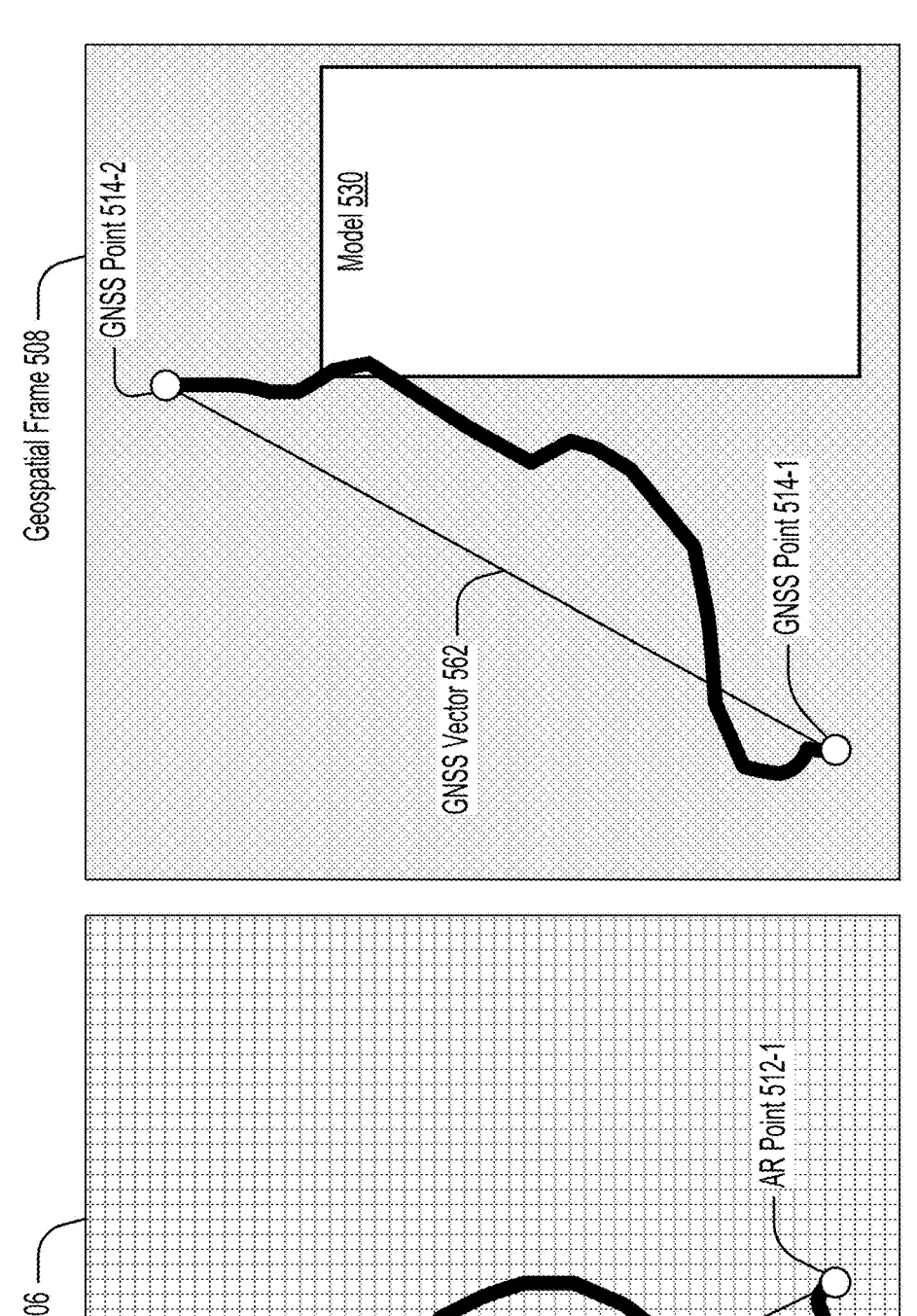
FIGS. 5A and 5B illustrate example steps for correlating an AR reference frame with a geospatial reference frame.
Figure 5B:
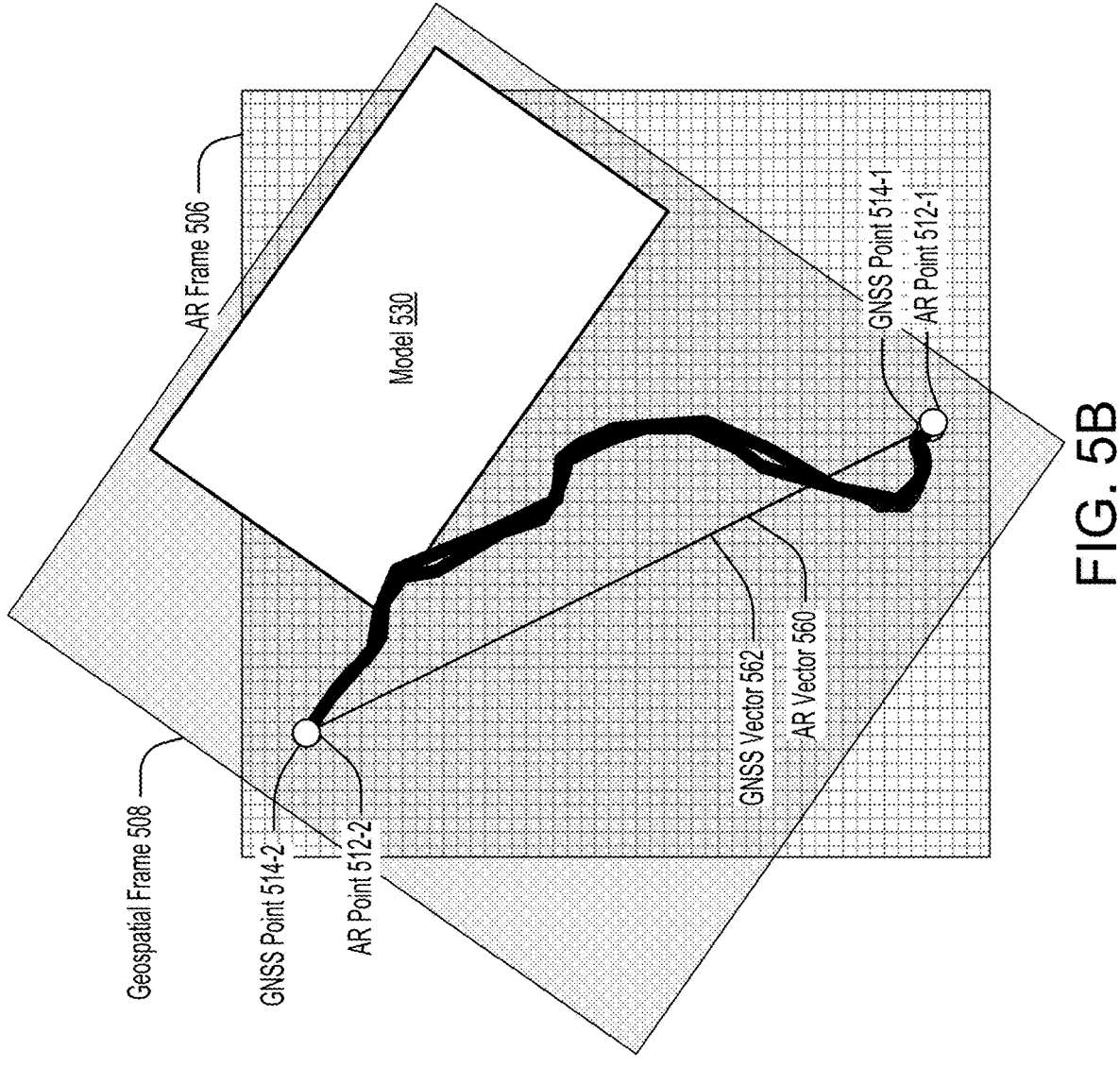

FIGS. 5A and 5B illustrate example steps for correlating an AR reference frame 506 with a geospatial reference frame 508, in accordance with some embodiments of the present disclosure. Referring to the left side of FIG. 5A, an AR point 512-1 within an AR reference frame 506 is determined at a first time and an AR point 512-2 within AR reference frame 506 is determined at a second time after the first time. Between the first time and the second time, additional AR points may be determined (as shown by the thick solid line). Referring to the right side of FIG. 5A, a GNSS point 514-1 within a geospatial reference frame 508 is determined at a third time and a GNSS point 514-2 within geospatial reference frame 508 is determined at a fourth time after the third time. Between the third time and the fourth time, additional GNSS points may be determined (as shown by the thick solid line).

AR points 512 may be calculated using vision-based or inertia-based measurements, such as camera images, angle data, and/or acceleration data. GNSS points 514 may be calculated using satellite-based measurements, such as GNSS position data. In some examples, AR point 512-1 may be closely aligned with GNSS point 514-1 in time (e.g., the first time and the third time may be within a threshold time of each other) and AR point 512-2 may be closely aligned with GNSS point 514-2 in time (e.g., the third time and the fourth time may be within a threshold time of each other). In some examples, a model 530 as defined by model data may be registered within geospatial reference frame 508 as shown in FIG. 5A.

To facilitate the manipulation of the reference frames, a GNSS vector 562 may be formed between GNSS points 514 and similarly an AR vector 560 may be formed between AR points 512. Referring to FIG. 5B, one or both of geospatial reference frame 508 and AR reference frame 506 may be shifted such that GNSS point 514-2 is aligned with AR point 512-2, and either geospatial reference frame 508 is rotated to AR reference frame 506 or AR reference frame 506 is rotated to geospatial reference frame 508 by an angle, causing GNSS vector 562 to become aligned with AR vector 560. Alignment may occur over several dimensions. For example, geospatial reference frame 508 may be shifted in each of three dimensions. Upon alignment of GNSS point 514-2 with AR point 512-2, GNSS vector 562 becomes aligned with AR vector 560 on at least one end of GNSS vector 562. Rotation of the reference frames may occur over several dimensions. For example, geospatial reference frame 508 may be rotated in each of three dimensions.

Figure 6A:
FIGS. 6A-6D illustrate example steps for capturing point clouds at multiple GNSS points.

FIGS. 6A-6D illustrate example steps for capturing point clouds at multiple GNSS points, in accordance with some embodiments of the present disclosure. In FIG. 6A, an AR device 600 is moved by a user to a particular position within a site. Using its GNSS receiver, AR device 600 is determined to be positioned at point A. Based on the number of satellites being tracked by the GNSS receiver, point A is determined to be a high-accuracy GNSS point. While at point A, AR device 600 captures a depth image of the surroundings, which is projected into 3D space to produce a point cloud 668A having points 670-1, 670-2, 670-3, and 670-4. Since AR device 600 is at a high-accuracy GNSS point, each of points 670-1, 670-2, 670-3, and 670-4 is stored in an accumulated point cloud and is displayed on the display of AR device 600, regardless of whether the points are inside or outside of a high-accuracy zone 678. AR device 600 may update high-accuracy zone 678 to surround point A.

Figure 6B:

In FIG. 6B, AR device 600 is moved by the user to a new position within the site. Using its GNSS receiver, AR device 600 is determined to be positioned at point B. Based on the number of satellites being tracked by the GNSS receiver, point B is determined to be a low-accuracy GNSS point. While at point B, AR device 600 captures a depth image of the surroundings, which is projected into 3D space to produce a point cloud 668B having points 670-5, 670-6, 670-7, and 670-8. Since AR device 600 is at a low-accuracy GNSS point, points 670 that are outside of high-accuracy zone 678, including points 670-7 and 670-8, are removed from point cloud 668B, are not stored in the accumulated point cloud, and are not displayed on the display of AR device 600. Points 670 that are inside of high-accuracy zone 678, including points 670-5 and 670-6, are stored in the accumulated point cloud and are displayed on the display of AR device 600 along with points 670-1, 670-2, 670-3, and 670-4.

Figure 6C:
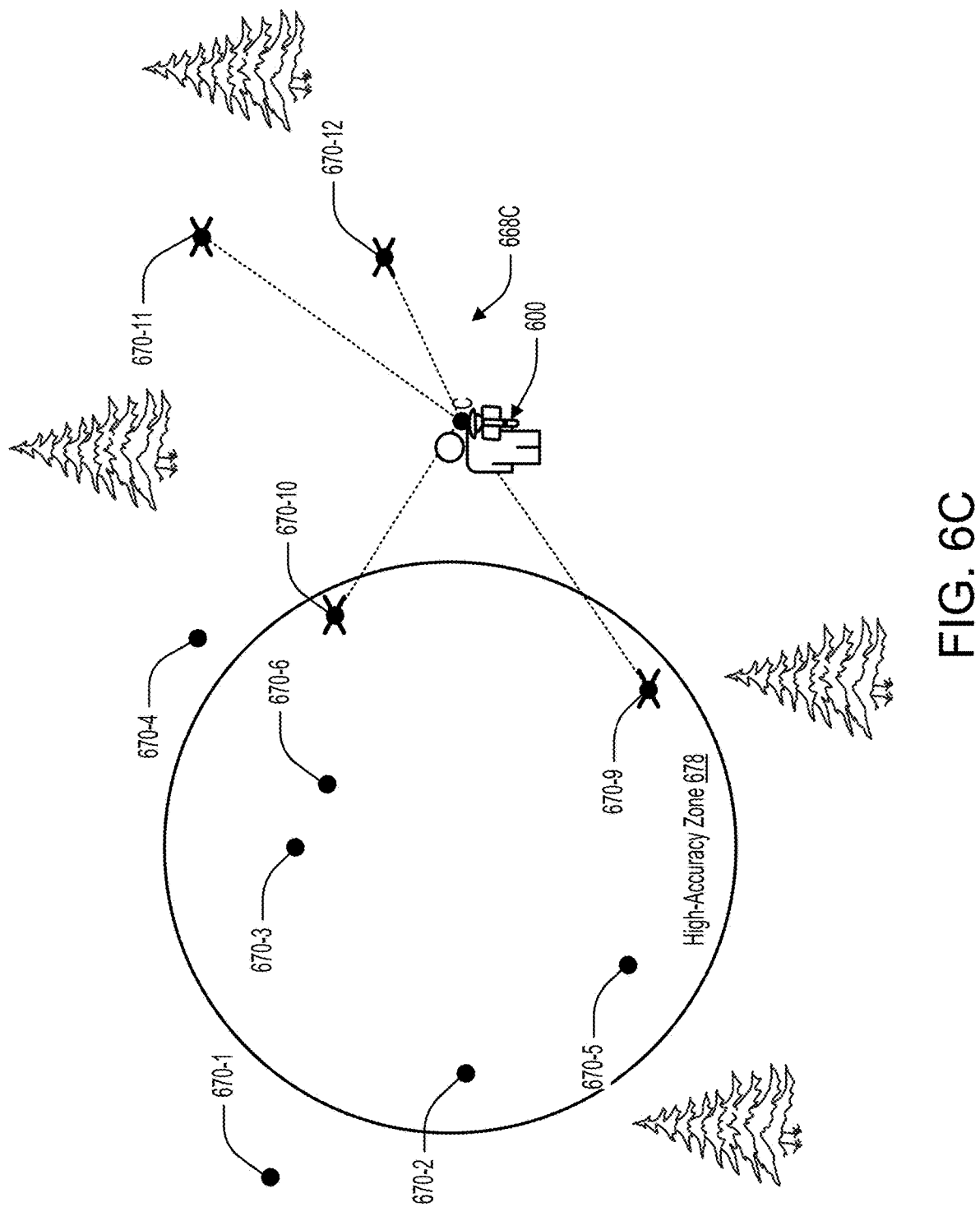

In FIG. 6C, AR device 600 is moved by the user to a new position within the site. Using its GNSS receiver, AR device 600 is determined to be positioned at point C. Based on the number of satellites being tracked by the GNSS receiver, point C is determined to be a low-accuracy GNSS point. While at point C, AR device 600 captures a depth image of the surroundings, which is projected into 3D space to produce a point cloud 668C having points 670-9, 670-10, 670-11, and 670-12. Since AR device 600 is at a low-accuracy GNSS point and point C itself is outside of high-accuracy zone 678, each of points 670-9, 670-10, 670-11, and 670-12 are removed from point cloud 668C, are not stored in the accumulated point cloud, and are not displayed on the display of AR device 600.

Figure 6D:
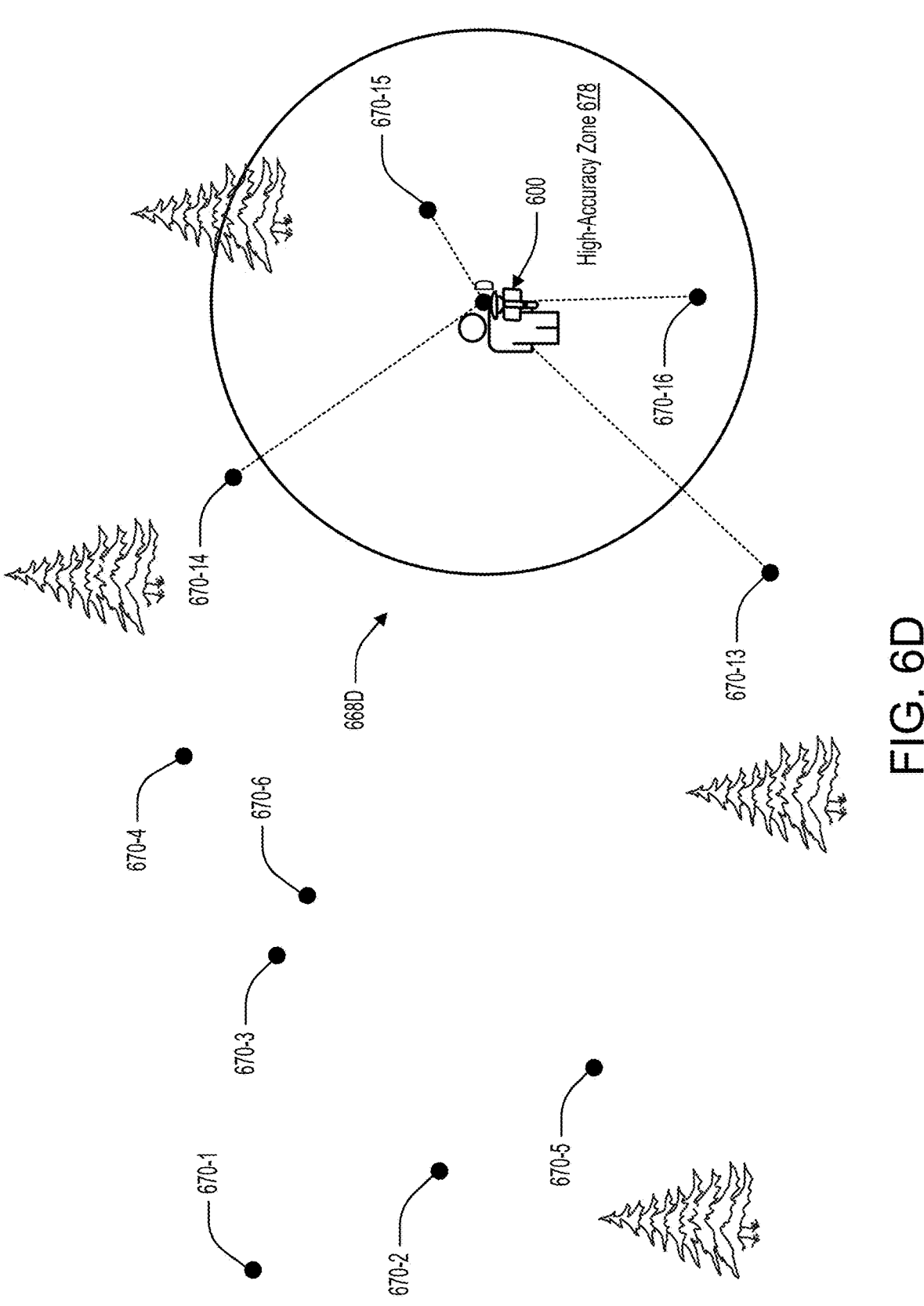

In FIG. 6D, AR device 600 is moved by a user to a new position within the site. Using its GNSS receiver, AR device 600 is determined to be positioned at point D. Based on the number of satellites being tracked by the GNSS receiver, point D is determined to be a high-accuracy GNSS point. While at point D, AR device 600 captures a depth image of the surroundings, which is projected into 3D space to produce a point cloud 668D having points 670-13, 670-14, 670-15, and 670-16. Since AR device 600 is at a high-accuracy GNSS point, each of points 670-13, 670-14, 670-15, and 670-16 is stored in the accumulated point cloud and is displayed on the display of AR device 600 along with points 670-1, 670-2, 670-3, 670-4, 670-5, and 670-6. AR device 600 may update high-accuracy zone 678 to surround point D.

Figure 7A:
FIG. 7A-7C illustrate example user interfaces for displaying captured point clouds at an AR device.
Figure 7B:
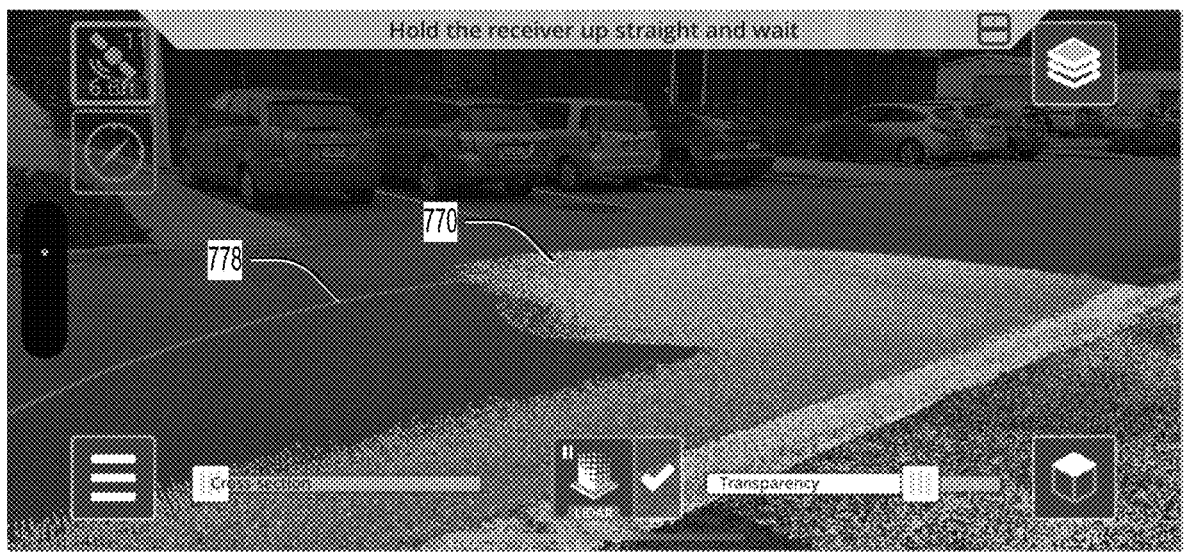
Figure 7C:
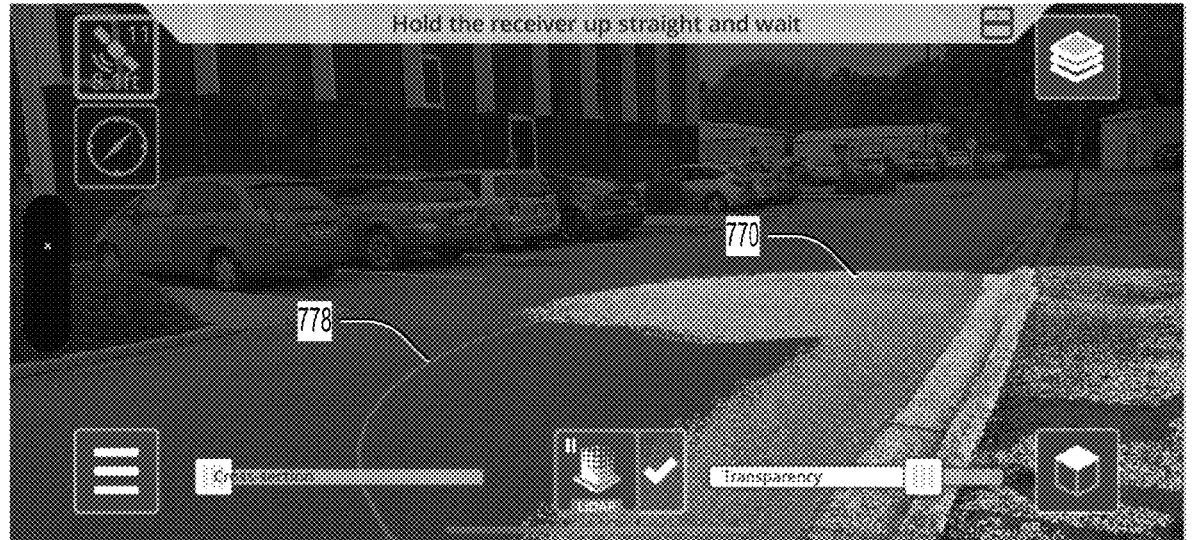

FIG. 7A-7C illustrate example user interfaces for displaying captured point clouds at an AR device, in accordance with some embodiments of the present disclosure. In FIG. 7A, points 770 are captured and displayed on a display of the AR device along with other features of a user interface. For example, the user interface includes an accuracy indicator that indicates a number of satellites being tracked by the GNSS receiver (e.g., 17 satellites) and an accuracy expressed in distance (e.g., 0.05 feet). The user interface further provides controls for adjusting the transparency of the model image (including points 770) and/or the transparency of the camera image (showing real-world objects including vehicles, street, grass). In the example of FIG. 7A, the GNSS point at which the AR device is positioned is determined to be a high-accuracy GNSS point. As such, all captured points 770 are added to the accumulated point cloud and are displayed on the display.

In FIG. 7B, the AR device is moved by a user to a new position and additional points 770 are captured and displayed on the display. Based on the number of satellites being tracked by the GNSS receiver (e.g., 11 satellites) and/or the accuracy expressed in distance (e.g., 6.6 feet), the GNSS point at which the AR device is positioned is determined to be a low-accuracy GNSS point. As such, a virtual representation of a high-accuracy zone 778 is displayed and only captured points 770 that are inside of high-accuracy zone 778 are added to the accumulated point cloud and are displayed on the display.

In FIG. 7C, the AR device is moved by a user to a new position and additional points are captured. Based on the number of satellites being tracked by the GNSS receiver (e.g., 11 satellites) and/or the accuracy expressed in distance (e.g., 8.1 feet), the GNSS point at which the AR device is positioned is determined to be a low-accuracy GNSS point. Furthermore, it is determined that the GNSS point is outside of high-accuracy zone 778. As such, none of the captured points are added to the accumulated point cloud to be displayed, and instead only previously added points to the accumulated point cloud are displayed on the display.

Figure 8:
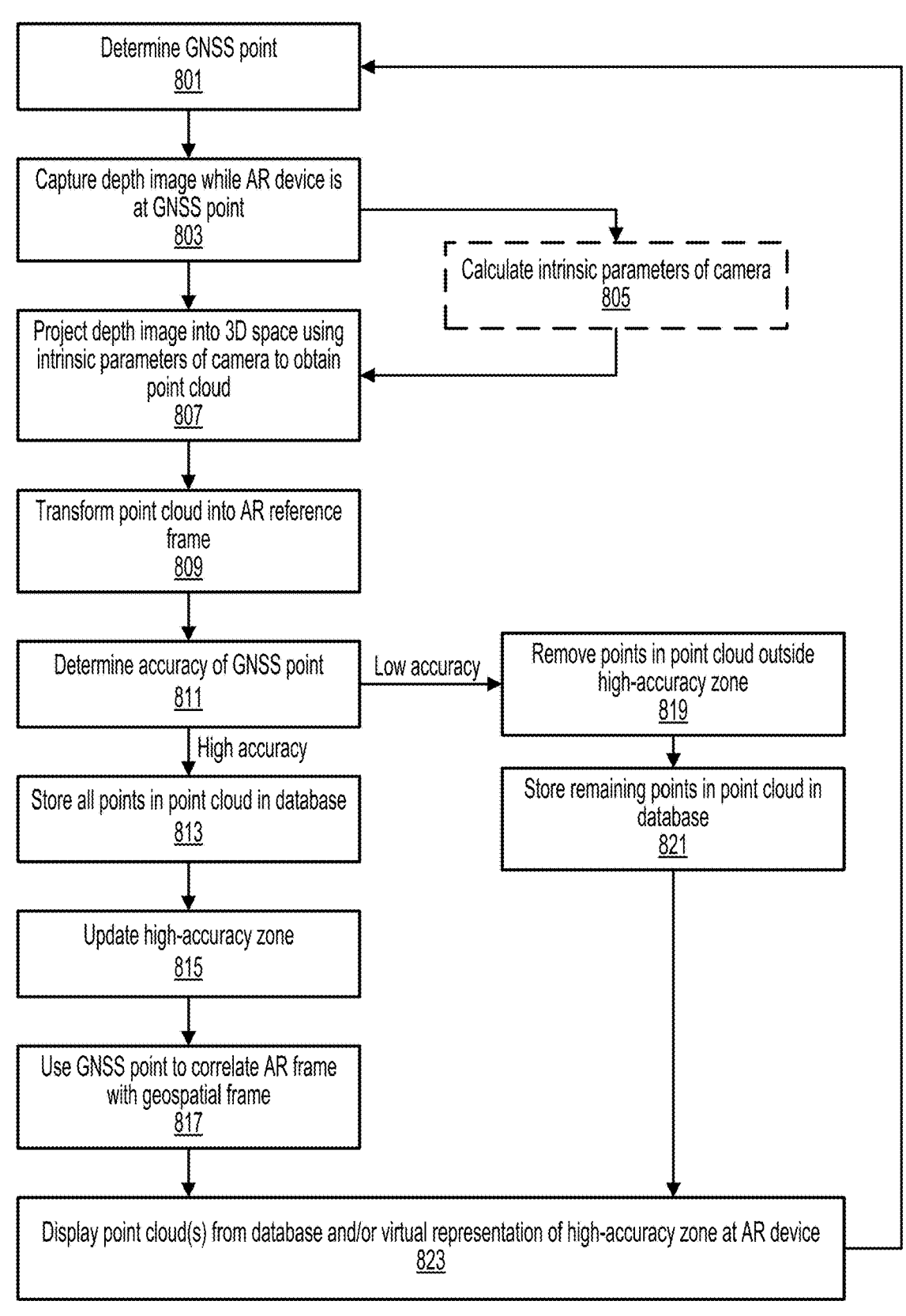
FIG. 8 illustrates a method of capturing and displaying point clouds using an AR device.

FIG. 8 illustrates a method 800 of capturing and displaying point clouds using an AR device (e.g., AR devices 100, 200, 300, 600), in accordance with some embodiments of the present disclosure. One or more steps of method 800 may be omitted during performance of method 800, and steps of method 800 may be performed in any order and/or in parallel. One or more steps of method 800 may be performed by one or more processors, such as those included in a data processor (e.g., data processors 338, 438). Method 800 may be implemented as a computer-readable medium or computer program product comprising instructions which, when the program is executed by one or more computers, cause the one or more computers to carry out the steps of method 800.

At step 801, the AR device determines a GNSS point (e.g., GNSS point 514-2) within a geospatial reference frame (e.g., geospatial reference frame 508) based on received GNSS signals (e.g., GNSS signals 332) captured by a GNSS receiver (e.g., GNSS receiver 310). The GNSS point may be a position of the AR device within the geospatial reference frame.

At step 803, the AR device captures a depth image (e.g., depth images 354, 454) while the AR device is positioned at the GNSS point. The depth image may be captured using a depth sensor (e.g., depth sensor 250, 350) of the AR device. The depth sensor may be a LIDAR sensor.

At step 805, the AR device calculates intrinsic parameters of a camera (e.g., cameras 216, 316) of the AR device. The intrinsic parameters may include a focal length of the camera and principal point offsets of the camera.

At step 807, the AR device projects the depth image into 3D space to obtain a point cloud (e.g., point clouds 468, 668) having a set of points (e.g., points 670, 770). The depth image may be projected into 3D space to obtain the point cloud using the intrinsic parameters of the camera.

At step 809, the AR device transforms the point cloud into an AR reference frame (e.g., AR reference frame 506) using an AR transformation matrix (e.g., AR transformation matrix 484).

At step 811, the AR device determines an accuracy of the GNSS point. The accuracy of the GNSS point may be based on the number of satellites being tracked by the GNSS receiver. Based on the accuracy of the GNSS point, the AR device may determine that the GNSS point is a low-accuracy GNSS point (causing method 800 to proceed to step 819) or a high-accuracy GNSS point (causing method 800 to proceed to step 813). In some examples, it may be determined that the GNSS point is a low-accuracy GNSS point if the accuracy of the GNSS point is below an accuracy threshold and it may be determined that the GNSS point is a high-accuracy GNSS point if the accuracy of the GNSS point is above an accuracy threshold.

At step 813, the AR device stores each of the set of points in the point cloud in a database in an accumulated point cloud.

At step 815, the AR device updates a high-accuracy zone (e.g., high-accuracy zones 678, 778) to surround the GNSS point. The high-accuracy zone may be a spherical zone with a particular radius (e.g., 2, 5, or 10 meters).

At step 817, the AR device uses the GNSS point to correlate the AR reference frame with the geospatial reference frame. Step 817 may include performing method 900 described in FIG. 9.

At step 819, the AR device removes points from the set of points that are outside of the high-accuracy zone, which may have been previously updated to surround a previously determined high-accuracy GNSS point.

At step 821, the AR device stores remaining points from the set of points that are inside the high-accuracy zone in the database in the accumulated point cloud.

At step 823, the AR device displays the accumulated point cloud from the database on a display (e.g., displays 156, 356) of the AR device. If the GNSS point is a high-accuracy point, the accumulated point cloud that is displayed may include each of the set of points in the point cloud. If the GNSS point is a low-accuracy point, the accumulated point cloud that is displayed may include the remaining points from the set of points that are inside the high-accuracy zone. In some examples, the accumulated point cloud that is displayed may include points from multiple point clouds that have been accumulated over multiple iterations through method 800. In some examples, the AR device may display a virtual representation of the high-accuracy zone on the display.

Figure 9:
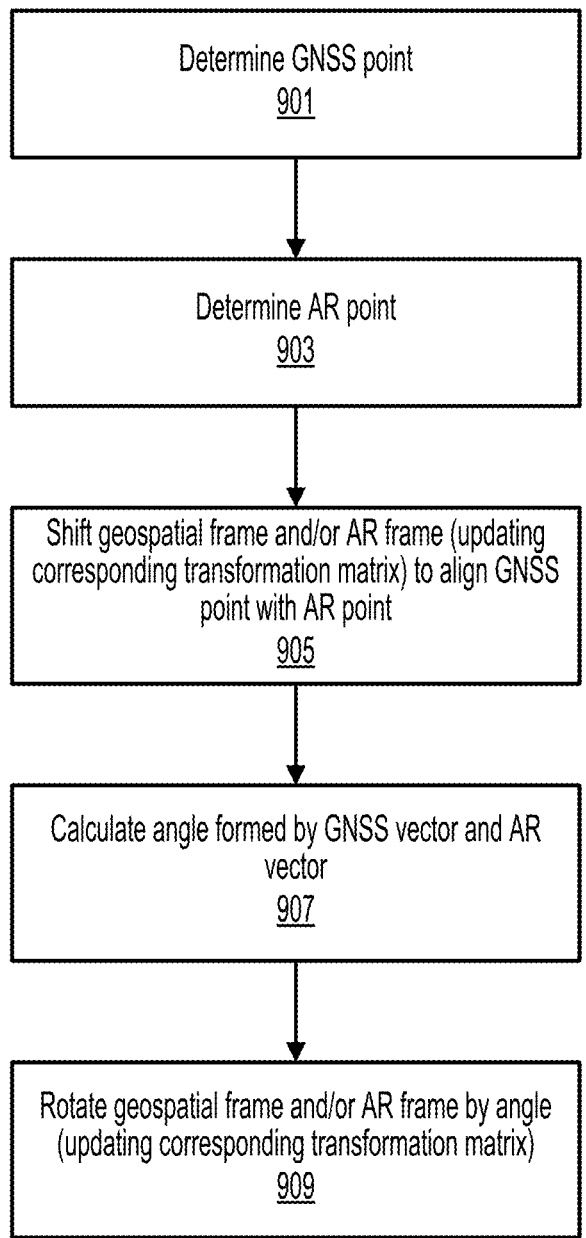
FIG. 9 illustrates a method of correlating an AR reference frame with a geospatial reference frame for an AR device.

FIG. 9 illustrates a method 900 of correlating an AR reference frame (e.g., AR reference frame 506) with a geospatial reference frame (e.g., geospatial reference frame 508) for an AR device (e.g., AR devices 100, 200, 300, 600), in accordance with some embodiments of the present disclosure. One or more steps of method 900 may be omitted during performance of method 900, and steps of method 900 may be performed in any order and/or in parallel. One or more steps of method 900 may be performed by one or more processors, such as those included in a data processor (e.g., data processors 338, 438). Method 900 may be implemented as a computer-readable medium or computer program product comprising instructions which, when the program is executed by one or more computers, cause the one or more computers to carry out the steps of method 900.

At step 901, the AR device determines a GNSS point (e.g., GNSS point 514-2) within the geospatial reference frame based on GNSS signals (e.g., GNSS signals 332) captured by a GNSS receiver (e.g., GNSS receivers 110, 210, 310). The GNSS point may be a position of the AR device within the geospatial reference frame.

At step 903, the AR device determines an AR point (e.g., AR point 512-2) within the AR reference frame based on a set of vision-based or inertia-based measurements including one or more camera images (e.g., camera images 118, 318, 418) captured by the camera, angle data (e.g., angle data 328, 428) captured by the angle sensor, and/or acceleration data (e.g., acceleration data 366, 466) captured by the acceleration sensor. For example, the AR point may be determined using visual odometry, visual inertial odometry (VIO), or simultaneous localization and mapping (SLAM) techniques. The AR point may be a position of the AR device within the AR reference frame.

At step 905, the AR device shifts the geospatial reference frame and/or the AR reference frame to align the GNSS point with the AR point. The geospatial reference frame and/or the AR reference frame may be shifted in at least one of three dimensions. Shifting the geospatial reference frame and/or the AR reference frame in a particular dimension causes all points in the geospatial reference frame and/or the AR reference frame to be translated by a particular amount. Step 905 may include updating an AR transformation matrix (e.g., AR transformation matrix 484) and/or a GNSS transformation matrix (e.g., GNSS transformation matrix 486) in accordance with the shift(s) of the geospatial reference frame and/or the AR reference frame.

At step 907, an angle between an GNSS vector (e.g., GNSS vector 562) and an AR vector (e.g., AR vector 560) is calculated. The GNSS vector may be formed between the (current) GNSS point and a previous GNSS point (e.g., GNSS point 514-1) and the AR vector may be formed between the (current) AR point and a previous AR point (e.g., AR point 512-1).

At step 909, the geospatial reference frame and/or the AR reference frame is rotated by the angle to align the GNSS vector with the AR vector. The geospatial reference frame and/or the AR reference frame may be rotated in at least one of three dimensions. Rotating the geospatial reference frame and/or the AR reference frame in a particular dimension causes all points in the geospatial reference frame and/or the AR reference frame (except for the GNSS point and/or the AR point) to be rotated with respect to the GNSS point and/or the AR point. Step 909 may include updating the AR transformation matrix and/or the GNSS transformation matrix in accordance with the rotate(s) of the geospatial reference frame and/or the AR reference frame.

Figure 10:
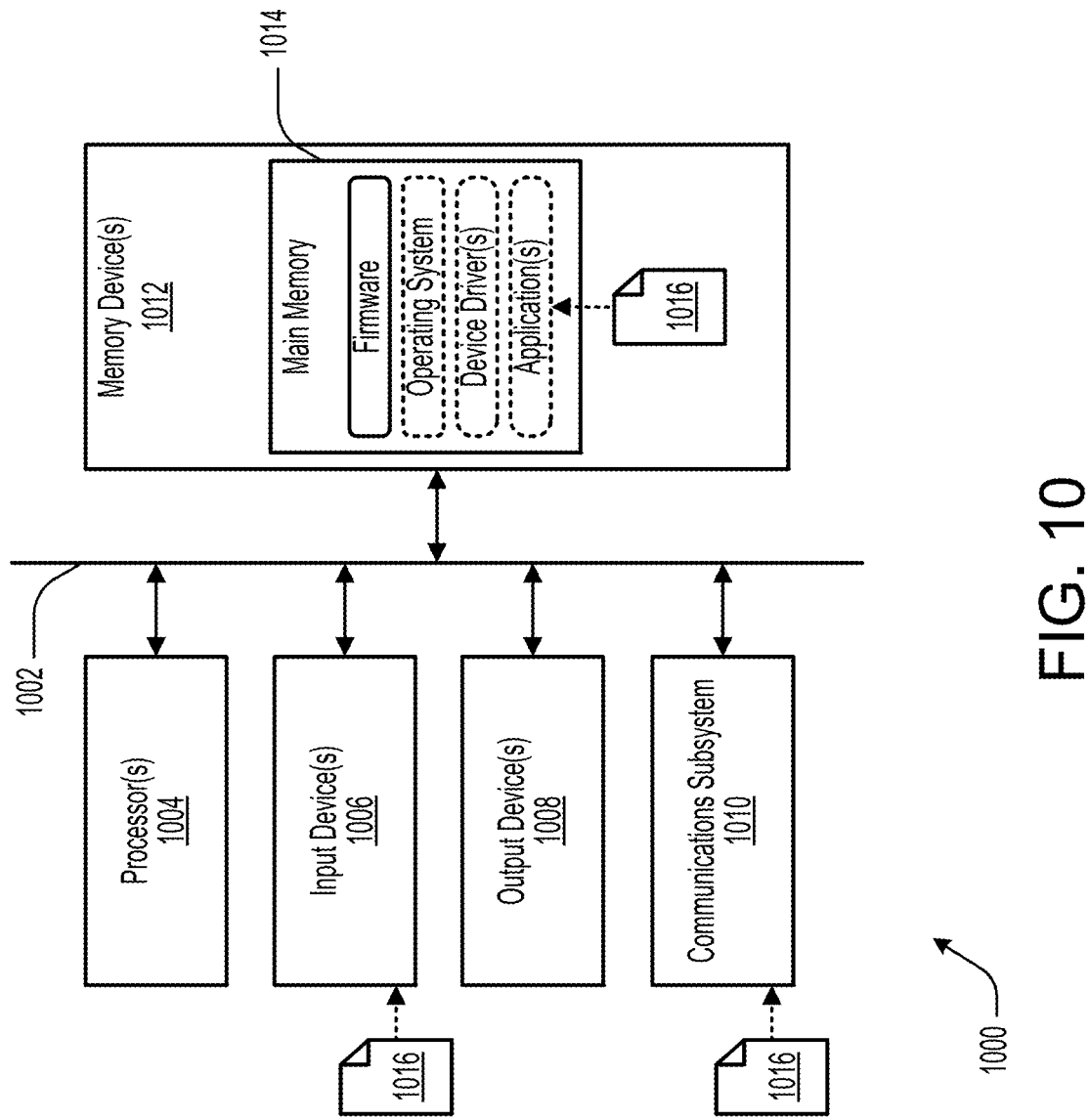
FIG. 10 illustrates an example computer system comprising various hardware elements.

FIG. 10 illustrates an example computer system 1000 comprising various hardware elements, in accordance with some embodiments of the present disclosure. Computer system 1000 may be incorporated into or integrated with devices described herein and/or may be configured to perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

In the illustrated example, computer system 1000 includes a communication medium 1002, one or more processor(s) 1004, one or more input device(s) 1006, one or more output device(s) 1008, a communications subsystem 1010, and one or more memory device(s) 1012. Computer system 1000 may be implemented using various hardware implementations and embedded system technologies. For example, one or more elements of computer system 1000 may be implemented within an integrated circuit (IC), an application-specific integrated circuit (ASIC), an application-specific standard product (ASSP), a field-programmable gate array (FPGA), such as those commercially available by XILINX®, INTEL®, or LATTICE SEMICONDUCTOR®, a system-on-a-chip (SoC), a microcontroller, a printed circuit board (PCB), and/or a hybrid device, such as an SoC FPGA, among other possibilities.

The various hardware elements of computer system 1000 may be communicatively coupled via communication medium 1002. While communication medium 1002 is illustrated as a single connection for purposes of clarity, it should be understood that communication medium 1002 may include various numbers and types of communication media for transferring data between hardware elements. For example, communication medium 1002 may include one or more wires (e.g., conductive traces, paths, or leads on a PCB or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 1002 may include one or more buses that connect the pins of the hardware elements of computer system 1000. For example, communication medium 1002 may include a bus that connects processor(s) 1004 with main memory 1014, referred to as a system bus, and a bus that connects main memory 1014 with input device(s) 1006 or output device(s) 1008, referred to as an expansion bus. The system bus may itself consist of several buses, including an address bus, a data bus, and a control bus. The address bus may carry a memory address from processor(s) 1004 to the address bus circuitry associated with main memory 1014 in order for the data bus to access and carry the data contained at the memory address back to processor(s) 1004. The control bus may carry commands from processor(s) 1004 and return status signals from main memory 1014. Each bus may include multiple wires for carrying multiple bits of information and each bus may support serial or parallel transmission of data.

Processor(s) 1004 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 1004 may include one or more multi-core processors, in which each core may read and execute program instructions concurrently with the other cores, increasing speed for programs that support multithreading.

Input device(s) 1006 may include one or more of various user input devices such as a mouse, a keyboard, a microphone, as well as various sensor input devices, such as an image capture device, a temperature sensor (e.g., thermometer, thermocouple, thermistor), a pressure sensor (e.g., barometer, tactile sensor), a movement sensor (e.g., accelerometer, gyroscope, tilt sensor), a light sensor (e.g., photodiode, photodetector, charge-coupled device), and/or the like. Input device(s) 1006 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 1008 may include one or more of various devices that convert information into human-readable form, such as without limitation a display device, a speaker, a printer, a haptic or tactile device, and/or the like. Output device(s) 1008 may also include devices for writing to removable storage devices or other removable media, such as those described in reference to input device(s) 1006. Output device(s) 1008 may also include various actuators for causing physical movement of one or more components. Such actuators may be hydraulic, pneumatic, electric, and may be controlled using control signals generated by computer system 1000.

Communications subsystem 1010 may include hardware components for connecting computer system 1000 to systems or devices that are located external to computer system 1000, such as over a computer network. In various embodiments, communications subsystem 1010 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 1012 may include the various data storage devices of computer system 1000. For example, memory device(s) 1012 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 1004 and memory device(s) 1012 are illustrated as being separate elements, it should be understood that processor(s) 1004 may include varying levels of on-processor memory, such as processor registers and caches that may be utilized by a single processor or shared between multiple processors.

Memory device(s) 1012 may include main memory 1014, which may be directly accessible by processor(s) 1004 via the address and data buses of communication medium 1002. For example, processor(s) 1004 may continuously read and execute instructions stored in main memory 1014. As such, various software elements may be loaded into main memory 1014 to be read and executed by processor(s) 1004 as illustrated in FIG. 10. Typically, main memory 1014 is volatile memory, which loses all data when power is turned off and accordingly needs power to preserve stored data. Main memory 1014 may further include a small portion of non-volatile memory containing software (e.g., firmware, such as BIOS) that is used for reading other software stored in memory device(s) 1012 into main memory 1014. In some embodiments, the volatile memory of main memory 1014 is implemented as RAM, such as dynamic random-access memory (DRAM), and the non-volatile memory of main memory 1014 is implemented as read-only memory (ROM), such as flash memory, erasable programmable read-only memory (EPROM), or electrically erasable programmable read-only memory (EEPROM).

Computer system 1000 may include software elements, shown as being currently located within main memory 1014, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 1016, which are executable by computer system 1000. In one example, such instructions 1016 may be received by computer system 1000 using communications subsystem 1010 (e.g., via a wireless or wired signal that carries instructions 1016), carried by communication medium 1002 to memory device(s) 1012, stored within memory device(s) 1012, read into main memory 1014, and executed by processor(s) 1004 to perform one or more steps of the described methods. In another example, instructions 1016 may be received by computer system 1000 using input device(s) 1006 (e.g., via a reader for removable media), carried by communication medium 1002 to memory device(s) 1012, stored within memory device(s) 1012, read into main memory 1014, and executed by processor(s) 1004 to perform one or more steps of the described methods.

In some embodiments of the present disclosure, instructions 1016 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 1000. For example, the non-transitory computer-readable medium may be one of memory device(s) 1012 (as shown in FIG. 10). In some cases, the non-transitory computer-readable medium may be separate from computer system 1000. In one example, the non-transitory computer-readable medium may be a removable medium provided to input device(s) 1006 (as shown in FIG. 10), such as those described in reference to input device(s) 1006, with instructions 1016 being read into computer system 1000 by input device(s) 1006. In another example, the non-transitory computer-readable medium may be a component of a remote electronic device, such as a mobile phone, that may wirelessly transmit a data signal that carries instructions 1016 to computer system 1000 and that is received by communications subsystem 1010 (as shown in FIG. 10).

Instructions 1016 may take any suitable form to be read and/or executed by computer system 1000. For example, instructions 1016 may be source code (written in a human-readable programming language such as Java, C, C++, C#, Python), object code, assembly language, machine code, microcode, executable code, and/or the like. In one example, instructions 1016 are provided to computer system 1000 in the form of source code, and a compiler is used to translate instructions 1016 from source code to machine code, which may then be read into main memory 1014 for execution by processor(s) 1004. As another example, instructions 1016 are provided to computer system 1000 in the form of an executable file with machine code that may immediately be read into main memory 1014 for execution by processor(s) 1004. In various examples, instructions 1016 may be provided to computer system 1000 in encrypted or unencrypted form, compressed or uncompressed form, as an installation package or an initialization for a broader software deployment, among other possibilities.

In one aspect of the present disclosure, a system (e.g., computer system 1000) is provided to perform methods in accordance with various embodiments of the present disclosure. For example, some embodiments may include a system comprising one or more processors (e.g., processor(s) 1004) that are communicatively coupled to a non-transitory computer-readable medium (e.g., memory device(s) 1012 or main memory 1014). The non-transitory computer-readable medium may have instructions (e.g., instructions 1016) stored therein that, when executed by the one or more processors, cause the one or more processors to perform the methods described in the various embodiments.

In another aspect of the present disclosure, a computer-program product that includes instructions (e.g., instructions 1016) is provided to perform methods in accordance with various embodiments of the present disclosure. The computer-program product may be tangibly embodied in a non-transitory computer-readable medium (e.g., memory device(s) 1012 or main memory 1014). The instructions may be configured to cause one or more processors (e.g., processor(s) 1004) to perform the methods described in the various embodiments.

In another aspect of the present disclosure, a non-transitory computer-readable medium (e.g., memory device(s) 1012 or main memory 1014) is provided. The non-transitory computer-readable medium may have instructions (e.g., instructions 1016) stored therein that, when executed by one or more processors (e.g., processor(s) 1004), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of capturing point clouds using an augmented reality (AR) device, the method comprising:
determining a global navigation satellite systems (GNSS) point of the AR device based on received satellite signals;
capturing a depth image while the AR device is positioned at the GNSS point;

projecting the depth image into 3D space to obtain a point cloud having a set of points;
determining an accuracy of the GNSS point; and
in response to determining that the accuracy of the GNSS point is below a threshold:
determining that the GNSS point is a low-accuracy GNSS point;
removing points from the set of points that are outside of a zone surrounding a previously determined high-accuracy GNSS point; and
displaying remaining points from the set of points that are inside the zone on a display of the AR device.

2. The method of claim 1, wherein the depth image is projected into 3D space using intrinsic parameters of a camera of the AR device.

3. The method of claim 1, further comprising:
determining a second GNSS point of the AR device based on the received satellite signals;
capturing a second depth image while the AR device is positioned at the second GNSS point;
projecting the second depth image into 3D space to obtain a second point cloud having a second set of points;
determining an accuracy of the second GNSS point;
in response to determining that the accuracy of the second GNSS point is above the threshold:
determining that the second GNSS point is a high-accuracy GNSS point;
updating the zone to surround the second GNSS point; and
displaying each of the second set of points on the display.

4. The method of claim 3, further comprising:
in response to determining that the accuracy of the GNSS point is below the threshold, storing the remaining points from the set of points in a database in an accumulated point cloud;
in response to determining that the accuracy of the second GNSS point is above the threshold, storing each of the second set of points in the database in the accumulated point cloud; and
displaying the accumulated point cloud on the display including the remaining points from the set of points and each of the second set of points.

5. The method of claim 3, further comprising:
transforming the point cloud into an AR reference frame using an AR transformation matrix; and
in response to determining that the accuracy of the second GNSS point is above the threshold, using the GNSS point to correlate the AR reference frame with a geospatial reference frame.

6. The method of claim 1, further comprising:
displaying a virtual representation of the zone on the display.

7. The method of claim 1, wherein the AR device comprises a camera component including a camera and a sensor component including a GNSS receiver, and wherein the camera component is separable from and configured to removably attach to the sensor component.

8. A non-transitory computer-readable medium comprising instructions that, when executed by one or more processors, cause the one or more processors to perform operations for capturing point clouds using an augmented reality (AR) device, the operations comprising:
determining a global navigation satellite systems (GNSS) point of the AR device based on received satellite signals;

capturing a depth image while the AR device is positioned at the GNSS point;

projecting the depth image into 3D space to obtain a point cloud having a set of points;

determining an accuracy of the GNSS point; and in response to determining that the accuracy of the GNSS point is below a threshold:

determining that the GNSS point is a low-accuracy GNSS point;

removing points from the set of points that are outside of a zone surrounding a previously determined high-accuracy GNSS point; and displaying remaining points from the set of points that are inside the zone on a display of the AR device.

9. The non-transitory computer-readable medium of claim 8, wherein the depth image is projected into 3D space using intrinsic parameters of a camera of the AR device.

10. The non-transitory computer-readable medium of claim 8, wherein the operations further comprise:

determining a second GNSS point of the AR device based on the received satellite signals;

capturing a second depth image while the AR device is positioned at the second GNSS point;

projecting the second depth image into 3D space to obtain a second point cloud having a second set of points;

determining an accuracy of the second GNSS point; and in response to determining that the accuracy of the second GNSS point is above the threshold:

determining that the second GNSS point is a high-accuracy GNSS point;

updating the zone to surround the second GNSS point; and displaying each of the second set of points on the display.

11. The non-transitory computer-readable medium of claim 10, wherein the operations further comprise:

in response to determining that the accuracy of the GNSS point is below the threshold, storing the remaining points from the set of points in a database in an accumulated point cloud;

in response to determining that the accuracy of the second GNSS point is above the threshold, storing each of the second set of points in the database in the accumulated point cloud; and displaying the accumulated point cloud on the display including the remaining points from the set of points and each of the second set of points.

12. The non-transitory computer-readable medium of claim 10, wherein the operations further comprise:

transforming the point cloud into an AR reference frame using an AR transformation matrix; and in response to determining that the accuracy of the second GNSS point is above the threshold, using the GNSS point to correlate the AR reference frame with a geospatial reference frame.

13. The non-transitory computer-readable medium of claim 8, wherein the operations further comprise:

displaying a virtual representation of the zone on the display.

14. The non-transitory computer-readable medium of claim 8, wherein the AR device comprises a camera component including a camera and a sensor component including a GNSS receiver, and wherein the camera component is separable from and configured to removably attach to the sensor component.

15. A system comprising:

one or more processors; and a non-transitory computer-readable medium comprising instructions that, when executed by the one or more processors, cause the one or more processors to perform operations for capturing point clouds using an augmented reality (AR) device, the operations comprising:

determining a global navigation satellite systems (GNSS) point of the AR device based on received satellite signals;

capturing a depth image while the AR device is positioned at the GNSS point;

projecting the depth image into 3D space to obtain a point cloud having a set of points;

determining an accuracy of the GNSS point; and in response to determining that the accuracy of the GNSS point is below a threshold:

determining that the GNSS point is a low-accuracy GNSS point;

removing points from the set of points that are outside of a zone surrounding a previously determined high-accuracy GNSS point; and displaying remaining points from the set of points that are inside the zone on a display of the AR device.

16. The system of claim 15, wherein the depth image is projected into 3D space using intrinsic parameters of a camera of the AR device.

17. The system of claim 15, wherein the operations further comprise:

determining a second GNSS point of the AR device based on the received satellite signals;

capturing a second depth image while the AR device is positioned at the second GNSS point;

projecting the second depth image into 3D space to obtain a second point cloud having a second set of points;

determining an accuracy of the second GNSS point; and in response to determining that the accuracy of the second GNSS point is above the threshold:

determining that the second GNSS point is a high-accuracy GNSS point;

updating the zone to surround the second GNSS point; and displaying each of the second set of points on the display.

18. The system of claim 17, wherein the operations further comprise:

in response to determining that the accuracy of the GNSS point is below the threshold, storing the remaining points from the set of points in a database in an accumulated point cloud;

in response to determining that the accuracy of the second GNSS point is above the threshold, storing each of the second set of points in the database in the accumulated point cloud; and displaying the accumulated point cloud on the display including the remaining points from the set of points and each of the second set of points.

19. The system of claim 17, wherein the operations further comprise:

transforming the point cloud into an AR reference frame using an AR transformation matrix; and in response to determining that the accuracy of the second GNSS point is above the threshold, using the GNSS point to correlate the AR reference frame with a geospatial reference frame.

20. The system of claim 15, wherein the operations further comprise:

displaying a virtual representation of the zone on the display.

* * * * *